United States Patent Office 3,281,497
Patented Oct. 25, 1966

3,281,497
TRANSITION METAL SALTS OF COMPLEX CARBOXYLIC ACIDS AS PROMOTERS OF POLYMERIZATION
Louis A. Joo, Johnson City, Tenn., and Walter E. Kramer, Niles, Ill., assignors, by mesne assignments, to Union Oil Company of California, Los Angeles, Calif., a corporation of California
No Drawing. Filed Dec. 5, 1962, Ser. No. 242,356
13 Claims. (Cl. 260—863)

This invention relates to the use of transition metal salts of complex carboxylic acids derived from sulfur-containing aromatic compounds of petroleum origin by metalation, carbonation and acidification, as activators for polymerization initiators. More specifically, this invention relates to the discovery that the transition metal salts of complex carboxylic acids derived from certan sulfur-conating aromatic compounds of petroleum origin by metalation, carbonation, and acidification are effective activators for polymerization initiators.

By transition metal salts as defined herein is meant the elements of the first transition series, (Sc, Ti, V, Cr, Mn, Fe, Co and Ni), the second transition series (Y, Zr, Nb, Mo, Tc, Ru, Rh and Pd) and the third transition series (La, Hf, Ta, W, Re, Os, Ir and Pt) using the accepted definition thereof from the prior art. Because of availability and cost, but not because of lack of utility, the members of the first transition series represent a preferred sub-genus of transition metals with V, Cr, Mn, Fe, Co, Ni and Cu being the preferred species therein. For industrial applications of this invention the preferred species are Mn, Fe, Co, Ni and Cu.

By polymerization is meant the reactions involved in resin systems, viz., those including unsaturated compounds such as unsaturated polyesters and involving addition polymerization wherein the speed of the reaction is dependent upon the decomposition of an initiator into free radicals. The accepted terms for the field of high polymers as proposed by the International Union of Pure and Applied Chemistry for catalytic substances are adhered to herein, that is, the names applied are in accordance with the mechanism of their action. The term "catalyst" is reserved for substances that are not consumed as they speed the reaction. Substances which are used to initiate addition polymerization, such as peroxides, are called "initiators." The compounds of this invention which activate the initiators are called "activators," etc.

A feature of this invention is the discovery that the transition metal salts of complex carboxylic acids as defined herein are more effective than the prior art "activators," such as cobalt naphthenate, for decomposing peroxide initiators such as methylethylketone peroxide, and this effectiveness is apparent at lower concentrations, e.g., 0.001 to 2.0% by weight based on the metal. Furthermore, the transition metal salts of this invention have all of the desirable properties for such activators, that is they are useful with cross-linking agents, operate over a wide temperature range, do not discolor the end product and are easily removed or do not have to be removed from the end product.

Accordingly, it becomes a primary object of this invention to provide a new class of activators for chemical reactions.

Another object of this invention is to provide a new class of activators for polymerization reactions.

An object of this invention is to provide a process for conducting polymerization reactions using the activators defined herein. A further object of this invention is to provide transition metal salts of complex carboxylic acids derived from sulfur-containing aromatic compounds of petroleum origin as activators for organic reactions.

These and other objects will be described or become apparent as the specification proceeds.

THE ACTIVATORS

The free complex carboxylic acids or acid mixtures used to prepare activators of this invention are prepared in accordance with the processes disclosed in copending applications, Serial No. 819,932, filed June 12, 1959 (now abandoned) by T. W. Martinek, Serial No. 79,661, filed December 30, 1960 now U.S. Patent 3,153,087 by Messrs. W. E. Kramer, L. A. Joo and R. M. Haines, and Serial No. 160,882, filed December 20, 1960 by T. W. Martinek, now U.S. Patent No. 3,222,137.

These acids are further described in related copending applications, Serial No. 79,541, filed December 30, 1960 now U.S. Patent 3,154,507 by Messrs. W. E. Kramer and L. A. Joo and Serial No. 79,506, filed December 30, 1960 by T. W. Martinek.

In accordance with said copending applications the complex, polynuclear, aromatic, and alkaromatic carboxylic acids are derived by metalation, carbonation, and acidification of a source of complex, polynuclear, aromatic nuclei illustrated by solvent extracts obtained from the solvent extraction of mineral lubricating oils using a solvent selective for aromatic compounds, hydrogenated and refined solvent extracts, fractions thereof, FCC recycle stock and decant oil from FCC processes. The free acids are transformed into transition metal salts for use as activators herein.

The sulfur-containing complex acids, hereinafter referred to as extract acids, or EPA, comprise mixtures of mono-, di- and polycarboxylic acids or selected fractions thereof. Through chemical analysis characterization and study of the physical and chemical properties, by way of illustration only, the extract acids can be represented by the following formulae:

Monobasic Acids

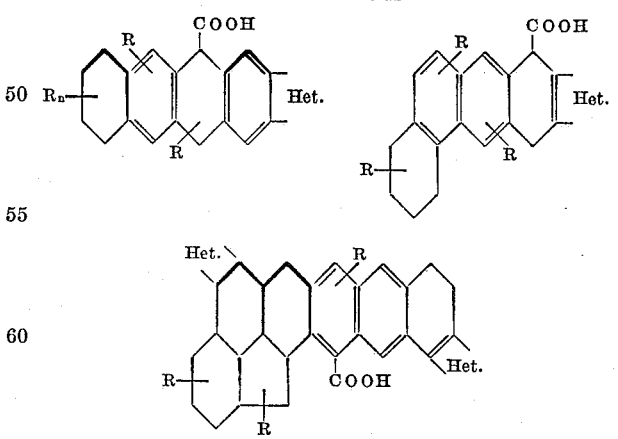

Dibasic Acids

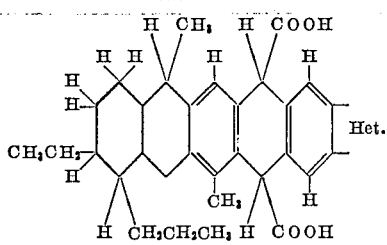

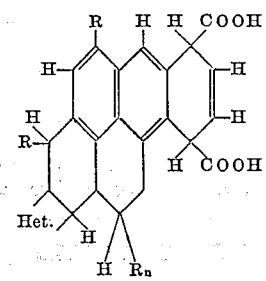

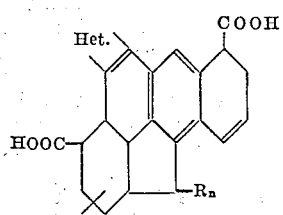

Tribasic Acids

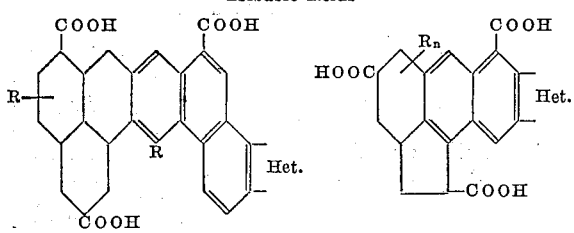

wherein "Het." illustrates one or more S—, or O-containing heterocyclic ring substituents, R is an alkyl or cycloalkyl (naphthenyl) radical having a total of 5 to 22 carbon atoms for each nucleus, and $n$ has a value of 3 to 10. The molecular weight of the extract acids ranges from about 300 to 750, and the average molecular weight is about 350 to 475. Table I gives representative physical and chemical properties of the extract mono-, di- and polycarboxylic acids to be used in accordance with this invention.

TABLE I

| Property: | Value |
|---|---|
| Av. mol. wt. range | 350–475 |
| Melting point, ° C. | 60–100 |
| Bromine No. | 4–24 |
| Percent sulfur | 1.0–4.5 |
| Color, deep red-dark brown. | |
| Percent unsaponifiables | 2–8 |

In the mixture of acids produced by metalation, carbonation, and acidification of solvent extracts, the monobasic acid derivatives constitute from 5–95% by weight, the dibasic acids constitute from 5–95% by weight and the polybasic acids, that is those acids containing from 3 to as high as 7 carboxyl groups, make up from 0 to 20% by weight. In the preferred embodiment of the invention, the mixture of acids produced by metalation, carbonation, and acidification of solvent extracts from the manufacture of refined mineral lubricating oils may be used, although fractions of such acids, such as those prepared by the method of copending applications, Serial No. 161,355 filed December 22, 1961, now U.S. Patent No. 3,228,963, Serial No. 209,741 filed July 13, 1962, now abandoned and Serial No. 209,780 filed July 13, 1962 now U.S. Patent No. 3,180,876 may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about —60° to 80° C. in the presence of a reaction solvent such as dimethyl glycol ether, dimethyl ether, methylalkyl ethers, dialkyl glycol ethers, tetrahydrofuran, methylal, and trimethylamine and the like. The formation of the adduct is promoted by shearing and agitation, providing an excess of alkali metal, using a preformed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about +20° C. to —80° C., causing a discharge of the color. This forms the alkali-metal salt of the complex acid which, upon acidification with a mineral acid, such as sulfuric, nitric or hydrochloric acids, yields the desired complex, polynuclear, carboxylic acids in good yields. To illustrate, the following non-limiting examples are given.

*Example I*

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of 3/16″ cubes. After 25 minutes, adduct-formation began and a strong color change took place. The product was cooled to —60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule (Acid No. 1 of Table II).

Example II

One hundred gms. of extract oil No. 19 (Table III) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, 5/16" in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

Example III

The process of Example II was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average, (Acid No. 3 of Table II).

Example IV

The various recovered acids of application Serial No. 819,932, illustrated in Table II therein, are further examples of mono-, di- and polycarboxylic acids to be used to prepare the activators of this invention.

Example V

The various carboxylic acid products described in Runs 12 through 47 of application Serial No. 79,661 are further examples of acids that may be used.

In order to further illustrate the complexity and types of acids that can be used in preparing the activators of this invention the following tabulation is given:

TABLE II
[Typical properties of a number of example complex acids (EPA)]

| No. | Sap. Value | Mol. Wt. | Percent S | Br. No. | Percent Unsap. | Eq. Wt. | Eqs./Mol. | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 [1] | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102 [2] | | 320 | | | | | | 240 |

[1] This EPA was used in the examples set forth herein.
[2] Prepared from decant oil (RPI gravity 15.40, RI 1.5425).

The starting material for the reaction to prepare the complex aromatic acids may be any complex, polynuclear, and/or heterocyclic aromatic hydrocarbon from petroleum sources. A preferred and unique source of aromatic starting material comprises petroleum fractions as herein defined, not only because the mono-, di- and polybasic acid products and the transition metal salts therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di- and polybasic carboxylic acids, or their mixtures, of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the activators of this invention.

TABLE III
[Sources and physical characteristics of solvent extracts]

| Ext. No. | Crude Source | Solvent | API Grav. | Sp. Gr. at 10° F. | Vis/ 100° F. | Vis/ 130° F. | Vis/ 210° F. | V.I. | ° F. Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs. | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene. | 10.0 | 1.000 | | | 1,500 | | +75 | 555 | 640 | 60 | | |
| 13 | Mid-Cont | Propane cresol. | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 84.1% aromatics, 15.9% saturates analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts from lubricating oils used as starting materials for this invention have the following general properties and characteristics:

TABLE IV

| Characteristic: | Range of value |
|---|---|
| Gravity, ° API | 7.3–18.3 |
| Gravity, Sp., 60/60° F. | 0.945–1.022 |
| Viscosity SUS at 210° F. | 40–1500 |
| Viscosity index | −128–+39 |
| Pour point (max.) ° F. | +35–+100 |
| Molecular weight, average (above 300) | 320–750 |
| Boiling point (initial) ° F. | 300–1000 |
| Boiling point (end) ° F. | 400–1200 |
| Sulfur, percent weight (total) | 0.5–4.5 |
| Sulfur compounds percent by vol. | 20–50 |
| Aromatic compounds | 25–90 |
| Neutral aromatic hydrocarbons | 40–51 |
| Av. No. of aromatic Rings/Mean Arom. Mol | 1.7–5.0 |

In characterizing the complex acids, their transition metal salts and activators of this invention, the molecular weights, sulfur content and average number of aromatic rings per mean aromatic molecule are the selected criteria.

The complexity of the types of compounds present, as based on these analyses, is illustrated by the following table:

TABLE V
[Estimated chemical composition of solvent Extracts Nos. 19, 21, 43 and 44 of Table III]

| Type of compound: | Approx. percent in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 00.5 |
|   Substituted benzphenanthrenes | 0.2 |
|   Substituted pyrenes | 0.2 |
| Pentanuclear aromatics: | |
|   Perylene | 0.01 |
| Sulphur compounds [1], oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100-50 p.s.i.g. using temperatures of 530-600° F. in the presence of a molybdena-silicia-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are °API, 9.5; color, NPA, 7; flash (COC), 420° F.; fire (COC), 465° F.; pour point, —5° F.; vis. at 100° F., 1075 SUS: vis. at 10° F., 58.5 SUS: VI, —96; Neut. No. (1948), 0.05; sulfur, 2.60 wt. percent and CR, percent 0.01.

The catalytic cracking of those fractions of crude petroleum oils between diesel burning oil and vacuum residuals furnishes sources of complex, high-molecular weight polynuclear aromatic and heterocyclic compounds utilizable as alternate feed materials for the preparation of the complex carboxylic acids and the novel activator products of this invention. The Orthoflow Fluid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in accordance with this invention, namely, the heavy FCC cycle stock (or so-called heavy gas oil) and the decant oil. The preparation of these by-product streams is illustrated as follows, said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates i.e., heavy gas oils from the distillation of crude oils, in an amount of about 23,750 BPSD, is preheated by exchange and sent to the orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to desuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, i.e., the gas from the process is compressed subjected to catalytic polymerization. The 23,750 BPSD of feed produces about 11,506 BPSD of gasoline, 2,381 BPSD of heating oil, 8,944 BPSD of heavy fuel oil and 1,263 BPSD of fuel gas.

In the treatment of 17,750 BPSD of fresh feed comprising distillates using a synthetic cracking catalyst at 900° F., 70% conversion at 1.5 through-put ratio (total charge divided by fresh feed) about 2,840 BPSD of $C_4$ hydrocarbons, 8,700 BPSD of $C_5$–400° gasoline, 4,438 BPSD of 400–600° light FCC cycle stock and 887 BPSD of decant oil is produced.

To illustrate, 17,004 BPSD of fresh feed and 4,253 BPSD of vacuum heavy gas oil from the vacuum tower (total 21,257 BPSD) is subjected to fluid catalytic cracking at about 900–880° F. using a standard cracking catalyst at a catalyst to oil ratio of about 8.4/1, space velocity of about 2.4 to produce 4,152 BPSD of light catalytic distillate, 7,516 BPSD of heavy gas oil recycle, 1,920 BPSD of decanted oil and 497 BPSD of net slurry recycle. The characteristics of the heavy cracked gas oil and decanted oil are shown in the following table.

TABLE VI
[Product characteristics]

| | Heavy FCC Recycle Stock | | Decanted Oil | |
|---|---|---|---|---|
| | No. 1 | No. 2 | No. 1 | No. 2 |
| Distillation: | | | | |
| ASTM D-1160 at 10 MM— | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 MM— | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158— | | | | |
| IBP, ° F | 479 | 462 | | |
| 50% | 616 | 618 | | |
| EP | 712 | 712 | | |
| Viscosity, $C_9$ at— | | | | |
| 100° F | 6.16 | 6.16 | ¹ 22.0 | ¹ 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point, ° F | 155.0 | 154.0 | 154.0 | 153.0 |
| °API | 26.2 | 25.7 | 14.8 | 14.6 |

¹ Extrapolated values.

The catalyst used in these experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which the polyester resins of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: °API, 1.8; sulfur, 1.9 wt. percent; Br. No. 17; RI (20° C.) 1.6372 and Engler Distillation, —IBP=589° F.; 90% —745° F. The use of these latter starting materials is described in copending application Ser. No. 79,661.

The results of hydrogenation of several of the solvent extracts shown in Table III to produce hydrogenated or dewaxed and hydrogenated solvent extracts as starting materials for the preparation of the complex acid mixture and subsequent ester preparation are shown in Table VI.

with naphthenic rings to form configurations similar to the steroid ring systems. Extract acids from solvent extracts obtained in the production of bright stocks probably contain more highly condensed aromatic structures. Most of the sulfur is in the form of heterocyclic rings with carbon associated with both the aromatic-type and napthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal. Chem., TABLE VII
[Hydrogenation of solvent extracts and products]

| Run No. | 1 | 2 | 3 | 4 | 5 | 6 | 7 | 8 | 9 | Range of Conditions and Product Properties |
|---|---|---|---|---|---|---|---|---|---|---|
| Reaction Conditions: | | | | | | | | | | |
| Extract No. | 43 | 44 | 44 | 44 | 41 | 43 | ¹43 | 44 | ¹44 | |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., °F | 700 | 700 | 650 | 650 | 650 | 675 | 700 | 700 | 720 | 650–720 |
| Pressure, p.s.i.g. | 500 | 500 | 400 | 400 | 300 | 400 | 400 | 500 | 500 | 300–500 |
| Catalyst | (²) | (²) | (²) | (²) | (²) | (²) | (²) | (²) | (²) | (²) |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., °API | 12.8 | 9.4 | 8.5 | 8.8 | 18.5 | 11.8 | 12.9 | 10.1 | 9.7 | 8.0–15.0 |
| Vis at 100° F | 663.7 | 1,133 | 1,457 | 1,452 | 132.5 | 808.7 | 851.1 | 464 | 1,058 | 450–1,500 |
| VI | —33 | —96 | —115 | —114 | —9 | —49 | —52 | —83 | —96 | —120 – —9 |

¹ Dewaxed.  ² Filtrol.

Table VI also sets forth the range of conditions and product properties that are generally applicable in the preparation of hydrogenated solvent extracts as starting materials in the preparation of the complex acids to be used in this invention.

Another typical example of an FCC decant oil is one having an API gravity of 15.4°, IBP 375° F. and EP 955° F. at atmospheric pressure, CS vis. at 100° F. 21.00, CS vis. at 210° F. 2.66, percent S 0.870, Ramsbottom C 1.70, mol. wt. 320, vis. gr. con. .945, Br. No. 8.0. The 45 vol. percent extract from this decant oil has a specific gravity of 1.095, exhibits the same initial boiling point and end boiling point and has the following characteristics: CS vis. at 100° F. 223.5, CS vis. at 210° F. 7.80, percent S 1.44, Ramsbottom C 5.7, vis. gr. con. 1.103, Br. No. 14.0, which is another species of the starting material.

The FCC recycle stock is illustrated by the 19% extract (phenol solvent) of FCC recycle stock, which extract had the following properties: ° API, 1.8; sulfur, 1.9 wt. percent; Br. No. 17; RI (20° C.) 1.6372 and Engler Distillation, —IBP=589° F.; 90% —745° F. The use of these latter starting materials is described in copending application Ser. No. 79,661.

Without limiting the invention, the characteristics of the salts of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl substituents varies between 5 to 22. Despite the size of the acid molecules the linkages through or between the carboxyl groups are about the same as those of phthalic and terephthalic acids. A portion of the aromatic rings or condensed aromatic rings are probably further condensed 38, 1928 (1956)). They are soluble in ethyl ether, acetone, methyl ethyl ketone, tetrahydrofuran, benzene, toluene and xylene.

The foregoing mixed complex carboxylic acids, anyone of the numerous examples being illustrative, fractions thereof and mixtures of fractions, are transformed into the transition metal salts by direct reaction with a base or salt of a transition metal using conditions and techniques that are known for this type of reaction. A preferred method is to react the alkali metal salt of the complex carboxylic acid, which is formed after the carbonation step, with a water-soluble salt of a transition metal, since the alkali metal salts of the acids are also water soluble. Among the water soluble salts that can be used are the nitrates, chlorides, and sulfates of the transition metals. Illustrative examples are copper chloride, nickel chloride, cobalt chloride, iron chloride, manganese chloride, chromium chloride, vanadium chloride, copper nitrate, nickel nitrate, cobalt nitrate, ferric nitrate, manganese nitrate, chromium nitrate, vanadium nitrate, copper sulfate, nickel sulfate, ferric sulfate, chromium sulfate, and vanadium sulfate.

The reaction can be carried out at ambient temperatures or by heating to temperatures in the order of 50° to 150° C., and preferably about 67–75° C. using at least a stoichiometric amount of the transition metal salt to complete the metathesis reaction. The transition metal salts are water insoluble, and are separated as a precipitate, water washed several times, and dried for use.

Typical examples of activators to be used in accordance with this invention are:

(1) The cobalt salt of the complex carboxylic acid derived in accordance with Example I prepared by reacting the aqueous phase, before acidification, with 200 g. of cobaltous nitrate at 60° C., separating the precipitate of the cobalt salt, water washing the precipitate and drying.

(2) The nickel salt of the complex acids of Example I prepared as above using nickel nitrate.
(3) The iron salt of the complex acid of Example II.
(4) The manganese salt of the complex acid of Example III and any of the following transition metal salts.

TABLE VIII
[Transition metal salts (activators)]

| Salt No. | Metal Portion | Identification of Complex Acid Portion |
|---|---|---|
| 5 | Fe | Acid No. 1 of Table II. |
| 6 | Ti | Acid No. 3 of Table II. |
| 7 | V | Acid No. 24 of Table II. |
| 8 | Cr | Acid No. 53 of Table II. |
| 9 | Mn | Acid No. 54 of Table II. |
| 10 | Fe | Acid No. 8 of Table II. |
| 11 | Co | Acid from Example I. |
| 12 | Ni | Acid from Example I. |
| 13 | Mn | Acid from Example III. |
| 14 | Fe | Acid from Example I. |
| 15 | Co | Acid from Example II. |
| 16 | Mo | Acid from Example I. |
| 17 | Cu | Acid from Example II. |
| 18 | Mn | Acid from Example II. |

The activators of this invention are useful in any system wherein an activator promotes a chemical reaction. For example, the activators of this invention can be used with various polymerizable monomers and mixtures of monomers which are curable as peroxide-initiated polymerizable compounds. These include the various polymerizable monomers having a terminal ethylenic group, i.e., $CH_2=C<$, such as styrene; substituted styrenes, e.g., divinyl benzene, alpha-methyl styrene, vinyl toluene, dichlorostyrene, vinyl ethylbenzene, etc.; vinyl halide compounds, e.g., vinyl chloride, vinylidene chloride, vinyl bromide, etc.; diolefin compounds, e.g., butadiene-1,3,2-methyl butadiene-1,3 chloroprene, 2-cyanobutadiene-1,3; vinyl ethers and esters, e.g., divinyl ether, vinyl acetate, vinyl propionate, vinyl acrylate, divinyl oxalate, etc.; vinyl ketones, e.g., divinyl ketone, vinyl ethyl ketone, etc.; acrylic and methacrylic acids and derivatives thereof including the nitriles of said acids, e.g., acrylonitrile, the amides of said acids, e.g., acrylamide, esters of an acrylic acid, e.g., ethyl acrylate, butyl acrylate, methyl methacrylate, propyl methacrylate, propyl alpha-chloroacrylate, benzyl acrylate, chlorobenzyl acrylate, etc.; polyesters of acrylic acids, e.g., ethylene diacrylate, etc.; allyl and methallyl ethers and allyl and methallyl esters of monocarboxylic and polycarboxylic saturated and unsaturated acids, e.g., vinyl allyl ether, diallyl phthalate, diallyl carbonate, diallyl maleate, etc.; and the like.

The novel activators of this invention are also useful where a peroxide is used to initiate the cross-linking of a linear unsaturated polyester resin with a monomer having a terminal ethylenic group to form a thermosetting polymer. The polymerization activators of this invention may also be used in combination with a peroxide catalyst to cause a certain amount of reaction between double bonds in linear polyester resins resulting in the formation of a cross-linked structure. Polyester resins are the polycondensation products of dicarboxylic acids with dihydroxy alcohols. These compounds may be modified by monocarboxylic acids, monohydroxy alcohols, and even small amounts of polycarboxylic acids or polyhydroxy alcohols. The unsaturated polyester resins are produced when any of the reactants contain nonaromatic unsaturation. Examples of acids used in the preparation of polyesters are unsaturated dibasic acids, such as maleic acid, fumaric, chloromaleic, itaconic acid, citraconic acid, etc.; saturated dibasic acids, such as succinic acid, glutaric acid, adipic acid, pimelic acid, suberic acid, etc.; and monocarboxylic acids which are utilized as modifiers, such as acetic acid, caproic acid, lauric acid, myristic acid, oleic acid, etc. Alcohols used in the preparation of polyester resins include unsaturated dihydroxy compounds, such as allyl alcohol, 2,5-dimethyl 3-hexyne-2,5-diol, 2-butene-1,4-diol, etc.; saturated dihydroxy compounds such as ethylene glycol, propylene glycol, diethylene glycol, dipropylene glycol, etc.; and monohydric alcohols which are used as modifiers, such as n-butanol, propanol, isopropanol, 2-ethyl hexanol, etc.

The term "acid" as used herein to describe the reactants in the polymerization system is intended to cover the anhydride as well as the acid since the anhydride may be used whenever available and desirable.

Illustrative of unsaturated polyester resins are propylene glycol maleate, diethyl fumarate, diethyl maleate, dibutyl fumarate, ethylene glycol fumarate, diallyl maleate, diallyl fumarate, dimethallyl maleate, etc.

Some of the peroxides which may be utilized as catalysts or initiators in accordance with this invention in conjunction with the polymerization activators of this invention are: cumene hydroperoxide, dichloro-benzoyl peroxide, tertiary butyl hydroperoxide, benzoyl peroxide, tertiary butyl perbenzoate, acetyl benzoyl peroxide, caprylyl peroxide, lauroyl peroxide, hydroxyheptyl peroxide, methyl ethyl ketone peroxide, 1-hydroxycyclohexyl hydroperoxide-1, ditertiary butyl perphthalate, dibenzaldiperoxide, tertiary butyl peroxide, 2,2-(tertiary butylperoxy) butane, bis(parabromobenzoyl)peroxide, bis(parachlorobenzoyl)peroxide, bis(succinyl)peroxide, and bis(chloroacetyl)peroxide, as well as said peroxide catalysts compounded with other compounds, such as benzoyl peroxide compounded with tricresyl phosphate, benzoyl peroxide compounded with dibutyl phthalate, methyl ethyl ketone peroxide in dimethyl phthalate, and cyclohexanone peroxide compounded with dibutyl phthalate. In general, the peroxide initiators are added to the polymerizable system in an amount from about 0.1 to 10% by weight of the polymerizable materials, with a range of about 0.25 to 5% being preferred.

TABLE IX

| System Number | Polymerizable System, Parts by Weight | Initiator, Parts by Weight | Activator, Parts by Weight—Metal |
|---|---|---|---|
| 1 | Propylene glycol maleate, 70 parts; styrene, 30 parts. | Methyl ethyl ketone peroxide, 1.0 parts | Cobalt salt of Example VI, 0.01 parts. |
| 2 | Acrylonitrile, 65 parts; butadiene, 35 parts. | Lauryl peroxide, 1.0 parts | Salt No. 9 of Table VIII, 0.10 parts. |
| 3 | Vinyl chloride, 80 parts; styrene, 20 parts. | Cumene hydroperoxide, 1.0 parts | Salt No. 10 of Table VIII, 0.05 parts. |
| 4 | Diallyl fumarate, 70 parts; vinyl-toluene, 30 parts. | Tertiary butyl hydroperoxide, 1.0 parts | Salt No. 12 of Table VIII, 0.07 parts. |
| 5 | Ethylene glycol fumarate, 60 parts; allyl diglycolate, 40 parts. | Tertiary butyl perbenzoate, 1.0 parts | Salt No. 17 of Table VIII, 0.03 parts. |
| 6 | Butyl methacrylate, 40 parts; castor oil vinylalkyd, 60 parts. | Tertiary butyl, hydroperoxide, 1.0 parts | Salt No. 11 of Table VIII, 0.04 parts. |

The conditions and procedures for carrying out such reactions are well known and need not be described in detail for purposes of this invention.

Activators, also referred to as "accelerators" or "promoters," are added to such resin systems to speed decomposition of the initiator into free radicals at room temperature or at temperatures considerably below those required to release free radicals when the initiator alone is used. As is demonstrated herein the presence of the transition metal salts of the complex carboxylic acids are superior activators for these resin systems employing an initiator such as in peroxide-initiated polymerizations. The accelerators of this invention are preferably used in resin systems in concentrations sufficient to give metal concentrations within the range of about 0.001 to about 2.0% by weight and are preferably used in concentrations sufficient to yield metal concentrations within the range of about 0.01 to about 0.2% by weight. The activators of this invention are superior to the activators of the prior art such as cobalt naphthenate, manganese naphthenate, the anilines, diethyl aniline, dimethyl aniline, the quaternary amines and the mercaptans, dodecyl mercaptan, and mercapto ethanol which are conventionally used in aromatic resins.

This superiority is due to the increased solubility imparted by the fused aromatic ring systems which characterize the acid portion of the transition metal salts of this invention. In addition, the initiators of this invention, contain an average of about one-half double bond per molecule having potential for cross-linking with the resin, a capacity which the saturated structures of the prior art initiators cannot share. Furthermore, this cross-linking potential and the presence of fused aromatic rings in the molecule tends to preclude any compatability problems that often arise in using the prior art initiators. In addition, the resins prepared using the initiators of this invention will have superior color over resins prepared by using the highly colored metallic naphthenates as initiators. In order to demonstrate the invention the following examples are given:

*Example VI*

A 300 g. portion of solvent extract and 25.0 g. of metallic sodium were charged to a dispersion flask and heated to 160° C. under an atmosphere of nitrogen. When the proper temperature was reached, the stirrer was turned on to make a dispersion. After four minutes, the stirrer was turned off and the dispersion was cooled to 20° C., whereupon a 1500 ml. portion of anhydrous tetrahydrofuran ("THF") was added, and the mixture was stirred to dissolve the oil. At this point, the solution had a black color. It was rapidly cooled to −25° C., and maintained at that temperature for 25 minutes. Then the reaction mixture was instantaneously carbonated by being poured onto a large quantity of Dry Ice.

After the excess carbon dioxide had been removed from the reaction mixture, the unreacted sodium was removed by centrifuging, and the THF stripped off, leaving a solid residue. This residue was washed several times with hexane to obtain substantially pure sodium salt of extract polybasic acid ("EPA"), a yellow powder.

A 200 g. portion of the sodium salt of EPA so prepared was dissolved in water. The solution was then warmed to 70° C., and 250 g. of cobaltous nitrate, $Co(NO_3)_2 \cdot 6H_2O$ was added to it. The precipitate of cobalt salt of EPA which resulted was separated by filtration, and washed several times with water to remove sodium nitrate and to obtain substantially pure cobalt salt. This salt was dried and was found to have a cobalt content of 18.0% w., and to be soluble in aromatic solvents (styrene, xylene, etc.).

A qualitative test of the salt as a polymerization activator established that it decomposed methylethylketone peroxide ("MEKPO") in the same manner as cobalt naphthenate. Further experiments have demonstrated quantitatively the superior effectiveness of the metal-EPA salts as activators for polymerization reactions (cobalt-EPA salt was used as a typical representative of the class).

Small amounts of cobalt naphthenate and of cobalt-EPA salt were added to separate portions of styrene (inhibited by manufacturer), and a small amount of MEKPO solution (60% MEKPO in dimethyl phthalate) was added to each solution. The solutions were kept at 50° C. and their viscosities checked periodically, using a Gardner Bubble Viscometer. The increase of viscosity was an index of degree of polymerization. The results, tabulated below, show cobalt-EPA salt to be a polymerization activator superior to cobalt naphthenate.

TABLE X

| Sample Number | Percent MEKPO Solution (Percent w.) | Percent Co Naphthenate Solution (Percent w.) | Percent Co EPA Salt (Percent w.) | Percent Co (Percent w.) | Viscosity (Stokes) After | | | |
|---|---|---|---|---|---|---|---|---|
| | | | | | 12 hrs. | 20 hrs. | 28 hrs. | 36 hrs. |
| 1 | 1 | | | | <0.5 | 0.8 | 2.2 | 5.7 |
| 2 | 1 | 0.30 | | 0.020 | <0.5 | 1.5 | 6.2 | 27.0 |
| 3 | 1 | | 0.09 | 0.018 | <0.5 | 2.3 | 15.5 | 120.0 |
| 4 | 1 | | 0.19 | 0.035 | <0.5 | 2.7 | 19.0 | 150.0 |
| 5 | 1 | | 0.38 | 0.070 | <0.5 | 2.8 | 28.0 | Gelled |
| 6 | 1 | | 0.75 | 0.140 | <0.5 | 2.6 | 19.0 | 148. |

The embodiments of this invention in which a privilege of property is claimed are defined as follows:

1. The method of polymerizing an unsaturated ester product of an acid of the group consisting of maleic, fumaric, chloromaleic, itaconic, citraconic, succinic, glutaric, adipic, pimelic and suberic acid and an alcohol of the group consisting of allyl alcohol, 2,5-dimethyl-3-hexyne-2,5-diol, 2-butene-1,4-diol, ethylene glycol, propylene glycol, diethylene glycol and dipropylene glycol which comprises heating said unsaturated ester product in the presence of a transition metal salt of complex carboxylic acids prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt, and transformation of said alkali metal salt to a transition metal salt, said complex carboxylic acids being characterized by having complex polynuclear, aromatic, alkyl-aromatic and heterocyclic nuclei predominating in carbon and hydrogen, containing about 1.0 to 4.5% by wt. of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

2. The method in accordance with claim 1 in which said transition metal salt is a member of the group consisting of the vanadium, chromium, manganese, iron cobalt, nickel and copper salt.

3. The method in accordance with claim 1 in which said transition metal salt is present in an amount ranging from about 0.001 to 2.0% by wt. based on the transition metal.

4. The method in accordance with claim 1 in which said polymerization is conducted in the presence of an added polymerizable monomer of the group consisting of styrene, divinyl benzene, alpha-methyl styrene, vinyl toluene, dichlorostyrene, vinyl ethylbenzene, vinyl chloride, vinylidene chloride, vinyl bromide, butadiene-1,3,2-methyl butadiene-1,3, chloroprene, 2-cyanobutadiene-1,3, divinyl ether, vinyl acetate, vinyl propionate, vinyl acrylate, divinyl oxalate, divinyl ketone, vinyl ethyl ketone, acrylic and methacrylic acids, acrylonitrile, acrylamide, ethyl acrylate, butyl acrylate, methyl methacrylate, propyl methacrylate, propyl alpha-chloroacrylate, benzyl acrylate, chlorobenzyl acrylate, ethylene diacrylate, vinyl allyl ether, diallyl phthalate, diallyl carbonate and diallyl maleate.

5. A method for polymerizing an unsaturated ester of an acid of the group consisting of maleic, fumaric, chloromaleic, itaconic, citraconic, succinic, glutaric, adipic, pimelic and suberic acid and an alcohol of the group consisting of allyl alcohol, 2,5-dimethyl-3-hexyne-2,5-diol, 2-butene-1,4-diol, ethylene glycol, propylene glycol, diethylene glycol and dipropylene glycol which comprises heating said ester in the presence of a peroxide catalyst and about 0.001 to 2.0% by wt. of an activator comprising a transition metal salt of complex carboxylic acids prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt, and transformation of said alkali metal salt to a transition metal salt, said complex carboxylic acids being characterized by having complex polynuclear, aromatic, alkyl-aromatic and heterocyclic nuclei predominating in carbon and hydrogen, containing about 1.9 to 4.5% by wt. of combined sulfur wherein the combined sulfur is bound in a heterocyclic group attached to an aromatic ring, also containing oxygen and nitrogen and having an average molecular weight of about 320 to 750, about 1.7 to 3.5 aromatic rings per mean aromatic molecule.

6. A method in accordance with claim 5 in which said transition metal salt is a member of the group consisting of vanadium, chromium, manganese, iron cobalt, nickel and copper salt.

7. A method in accordance with claim 5 wherein said polymerization is carried out in the presence of an added amount of a polymerizable monomer of the group consisting of styrene, divinyl benzene, alpha-methyl styrene, vinyl toluene, dichlorostyrene, vinyl ethylbenzene, vinyl chloride, vinylidene chloride, vinyl bromide, butadiene-1,3,2-methyl butadiene-1,3, chloroprene, 2-cyanobutadiene-1,3, divinyl ether, vinyl acetate, vinyl propionate, vinyl acrylate, divinyl oxalate, divinyl ketone, vinyl ethyl ketone, acrylic and methacrylic acids, acrylonitrile, acrylamide, ethyl acrylate, butyl acrylate, methyl methacrylate, propyl methacrylate, propyl alpha-chloroacrylate, benzyl acrylate, chlorobenzyl acrylate, ethylene diacrylate, vinyl allyl ether, diallyl phthalate, diallyl carbonate and diallyl maleate.

8. A method for preparing a copolymer which comprises heating about 70 parts of propylene glycol maleate and about 30 parts of styrene in the presence of about 1 part of methyl ethyl ketone peroxide and about 0.01 to 1 part of the cobalt salt of complex carboxylic acids prepared from solvent extracts obtained in the solvent extraction of mineral lubricating oils using a solvent selective for aromatic compounds, by reaction of said solvent extracts with sodium at a temperature of about 160° C. to form the sodium adduct, carbonation of said adduct at a temperature of about −25° C. to form the sodium salt of the corresponding carboxylic acid, transformation of said salt to the cobalt salt by reaction with cobaltous nitrate, said complex carboxylic acids being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

9. A method for preparing a copolymer which comprises heating about 65 parts of acrylonitrile and about 35 parts of butadiene in the presence of about 1 part of lauryl peroxide and 0.1 part of the manganese salt of complex carboxylic acids prepared from solvent extracts obtained in the solvent extraction of mineral lubricating oils using a solvent selective for aromatic compounds by reaction of said solvent extracts with sodium to form the sodium adduct, carbonation of said adduct to form the corresponding sodium salt and transforming said sodium salt to the manganese salt, said complex carboxylic acids being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

10. A method for preparing a copolymer which comprises heating about 80 parts of vinyl chloride, and about 20 parts of styrene in the presence of 1 part cumene hydroperoxide and 0.05 part of the iron salt of complex carboxylic acids prepared from solvent extracts obtained in the solvent extraction of mineral lubricating oils using a solvent selective for aromatic compounds by reaction of said solvent extracts with sodium to form the sodium adduct, carbonation of said sodium adduct to form the corresponding sodium salt and transforming said sodium salt to the iron salt, said complex carboxylic acid being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

11. A method for preparing a copolymer which comprises heating about 70 parts of diallyl fumarate and about 30 parts of vinyl toluene in the presence of about 1 part of tertiary butyl hydroperoxide and 0.07 part of the nickel salt of complex carboxylic acids prepared from solvent extracts obtained in the solvent extraction of mineral lubricating oils using a solvent selective for aromatic compounds by reaction of said solvent extracts with sodium to form the sodium adduct carbonation of said sodium adduct to form the corresponding sodium salt and transformation of said sodium salt to the nickel salt, said complex carboxylic acids being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

12. A method for preparing a copolymer which comprises heating about 60 parts of ethylene glycol fumarate and about 40 parts of allyl diglycolate in the presence of about 1 part of tertiary butyl perbenzoate and about 0.03 part of the copper salt of complex carboxylic acids prepared from solvent extracts obtained in the solvent extraction of mineral lubricating oils using a solvent selective for aromatic compounds by reaction of said solvent extracts with sodium to form the sodium adduct, carbonation of said adduct to form the corresponding sodium salt and transformation of said sodium salt into the copper salt, said complex carboxylic acids being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

13. A method for preparing a copolymer which comprises heating about 40 parts of butyl methacrylate and about 60 parts of castor oil vinylalkyd in the presence of about 1 part of tertiary butyl hydroperoxide and about 0.04 part of the cobalt salt of complex carboxylic acids prepared from solvent extracts obtained in the solvent extraction of mineral lubricating oils using a solvent selective for aromatic compounds by reaction of said solvent extracts with sodium to form the sodium adduct, carbonation of said adduct to form the corresponding sodium salt and transformation of said sodium salt into the cobalt salt, said complex carboxylic acids being characterized by having complex polynuclear, aromatic, alkyl-aromatic and heterocyclic nuclei predominating in carbon and hydrogen, containing about 1.0 to 4.5% by weight of combined sulfur wherein the combined sulfur is bound in a heterocyclic group attached to an aromatic ring, also containing oxygen and nitrogen, and having an average molecular weight of about 320 to 750, about 1.7 to 5.0 aromatic rings per mean aromatic molecule.

References Cited by the Examiner

UNITED STATES PATENTS

| | | | |
|---|---|---|---|
| 2,023,793 | 12/1935 | Scott | 260—665 |
| 2,091,020 | 8/1937 | Shipp | 106—310 |
| 2,205,994 | 6/1940 | Towne | 106—310 |
| 2,931,784 | 4/1960 | Raymond | 260—863 |

OTHER REFERENCES

Lochte et al.: "Petroleum Acids and Bases," Chemical Publishing Co., N.Y., 1955 (page 69 relied on) TP 690 L6 C2.

MURRAY TILLMAN, *Primary Examiner.*

J. T. GOOLKASIAN, *Assistant Examiner.*